US008442405B2

(12) United States Patent
Ellison et al.

(10) Patent No.: US 8,442,405 B2
(45) Date of Patent: May 14, 2013

(54) MULTI-STAGE POLARIZATION MODE DISPERSION COMPENSATION

(75) Inventors: John G. Ellison, Colchester (GB); Stephen Michael Webb, Gravesend (GB); David Winterburn, Romford (GB); Stephen Desbruslais, New Eltham (GB)

(73) Assignee: Xtera Communications, Inc., Allen, TX (US)

( * ) Notice: Subject to any disclaimer, the term of this patent is extended or adjusted under 35 U.S.C. 154(b) by 272 days.

(21) Appl. No.: 12/947,734

(22) Filed: Nov. 16, 2010

(65) Prior Publication Data

US 2012/0121254 A1    May 17, 2012

(51) Int. Cl.
*H04B 10/18* (2006.01)

(52) U.S. Cl.
USPC .............................. 398/147; 398/81; 398/159

(58) Field of Classification Search ............... 398/81, 398/147, 159
See application file for complete search history.

(56) References Cited

U.S. PATENT DOCUMENTS

| 7,003,183 | B1 | 2/2006 | Phua et al. | |
| 2003/0118263 | A1* | 6/2003 | Phua et al. | 385/11 |
| 2004/0096140 | A1 | 5/2004 | Zeng | |
| 2005/0201758 | A1 | 9/2005 | Isomura et al. | |
| 2007/0110451 | A1 | 5/2007 | Rasmussen et al. | |
| 2010/0111530 | A1 | 5/2010 | Shen et al. | |

OTHER PUBLICATIONS

Henrik Sunnerud, Chongjin Xie, Magnus Karlsson, Robert Samuelsson and Peter Andrekson, "A Comparison Between Different PMD Compensation Techniques," Journal of Lightwave Technology, vol. 20, No. 3, pp. 368-378, Mar. 2002.

Yu Mimura, Kazuhiro Ikeda, Tatsuya Hatano, Takeshi Takagi, Sugio Wako and Hiroshi Matsuura, "PMD Compensator and PMD Emulator," Furukawa Review, No. 24, pp. 23-28, 2003.

* cited by examiner

*Primary Examiner* — Leslie Pascal
(74) *Attorney, Agent, or Firm* — James Harlan

(57) ABSTRACT

A polarization mode dispersion compensator that includes two stages, one for reducing or eliminating first order polarization mode dispersion of an optical signal, and second stage for reducing or eliminating higher order polarization mode dispersion of the optical signal. In each stage, the polarization is adjusted so as to reduce polarization mode dispersion. Based on the power levels of various polarization states generated at the second polarization controller, the optical signal to noise ratio may be estimated. Furthermore, based on the amount of adjustment used to control the polarization controllers and the differential group delay, the polarization mode dispersion may be estimated.

16 Claims, 3 Drawing Sheets

MULTI-STAGE POLARIZATION MODE DISPERSION COMPENSATION

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optic signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

Optical dispersion is one effect that can limit signal quality in optical systems. Optical dispersion occurs when different portions of the signal travel at slightly different speeds within the optical fiber due to material and waveguide parameters. In single mode fiber, two significant causes of dispersion are chromatic dispersion and polarization mode dispersion (or PMD). Chromatic dispersion occurs because different wavelengths of light tend to travel through a fiber at slightly different speeds, causing a signal pulse to spread or disperse with distance traveled.

Polarization mode dispersion (PMD) occurs because the different polarization modes also travel at different speeds through an optical fiber. As light travels through the fiber, the polarization state of the light may change quite rapidly. These combined effects lead to dispersion of the optical signal as the signal travels through the optical fiber. Like chromatic dispersion, PMD can increase bit error rate and thereby reduce optical system performance.

BRIEF SUMMARY

Embodiments described herein relate to a polarization mode dispersion compensator that includes at least two stages, one for reducing or eliminating first order polarization mode dispersion of an optical signal, and second stage for reducing or eliminating higher order polarization mode dispersion of the optical signal. In each stage, the polarization is adjusted so as to reduce polarization mode dispersion. The first stage also includes a tunable different group delay element that is adjusted to reduce or eliminate first order polarization mode dispersion. The second stage includes another polarization controller that adjusts the polarization state to be suitable for a beam splitter.

In one embodiment, based on the power levels of the optical signals passed by and diverted by the beam splitter, the optical signal to noise ratio may be estimated. Furthermore, based on the amount of adjustment used to control the polarization controllers and the differential group delay, the polarization mode dispersion may be estimated. Thus, in that embodiment, polarization mode dispersion may be reduced, thereby improving system performance, while at the same time estimating key system parameters such as the optical signal to noise ratio (OSNR) and polarization mode dispersion.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a polarization mode dispersion (PMD) compensator is described that includes two stages, one for reducing or eliminating first order polarization mode dispersion of an optical signal, and a second stage for reducing or eliminating higher order polarization mode dispersion of the optical signal. In each stage, the polarization is adjusted so as to reduce polarization mode dispersion. In one embodiment, based on the power levels of various polarization states generated at the second polarization controller, the optical signal to noise ratio may be estimated. Furthermore, based on the amount of adjustment used to control the polarization controllers and the differential group delay, the polarization mode dispersion may be estimated. First, an example optical communications system will be described with respect to FIG. 1. Then, an example two stage PMD compensator will be described with respect to FIGS. 2 and 3.

Figure 1:
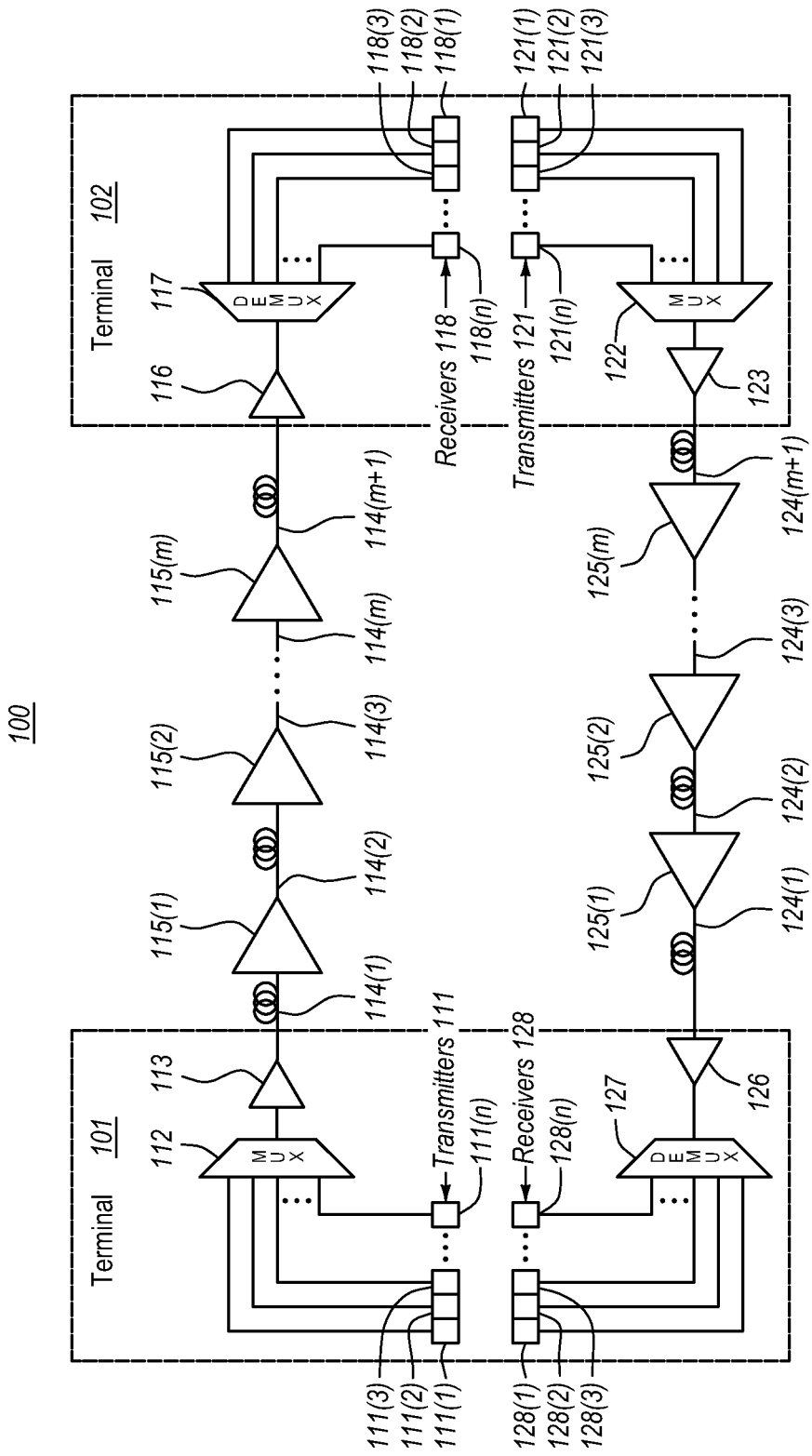
FIG. 1 illustrates an optical communication system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel.

The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first fiber link 114(1). Each optical fiber link may include, amongst other things, single mode fiber.

There are a total of "m" repeaters 115 and "m+1" optical fiber links 114 between the terminals 101 and 102 in the eastern channel. In an unrepeatered optical communication system, "m" would be zero such that there is but a single fiber link 114(1) and no repeaters between the terminals 101 and 102. In a repeatered optical communication system, "m" would be one or greater. Each of the repeaters, if present, may consume electrical power to thereby amplify the optical signals.

The eastern optical signal from the final optical fiber link 114(m+1) is then optionally amplified at the terminal 102 by the optional optical amplifier 116. The eastern optical signal is then demultiplexed into the various wavelength optical wavelength channels using optical demultiplexer 117. The various optical wavelength channels may then be received and processed by corresponding optical receivers 118 including receivers 118(1) through 118(n).

As for the western channel for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first fiber link 124(m+1). There are once again "m" repeaters 125 (labeled 125(1) through 125(m)), and "m+1" optical fiber links 124 (labeled 124(1) through 124(m+1)). Recall that in an unrepeatered environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be typically about 80 kilometers, and in practice may range from 30 kilometers or less to 100 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction. In addition, the principles described herein apply to asymmetric bi-directional optical channels in which there are a different number of repeaters in the eastern direction as compared to the western direction.

Figure 2:
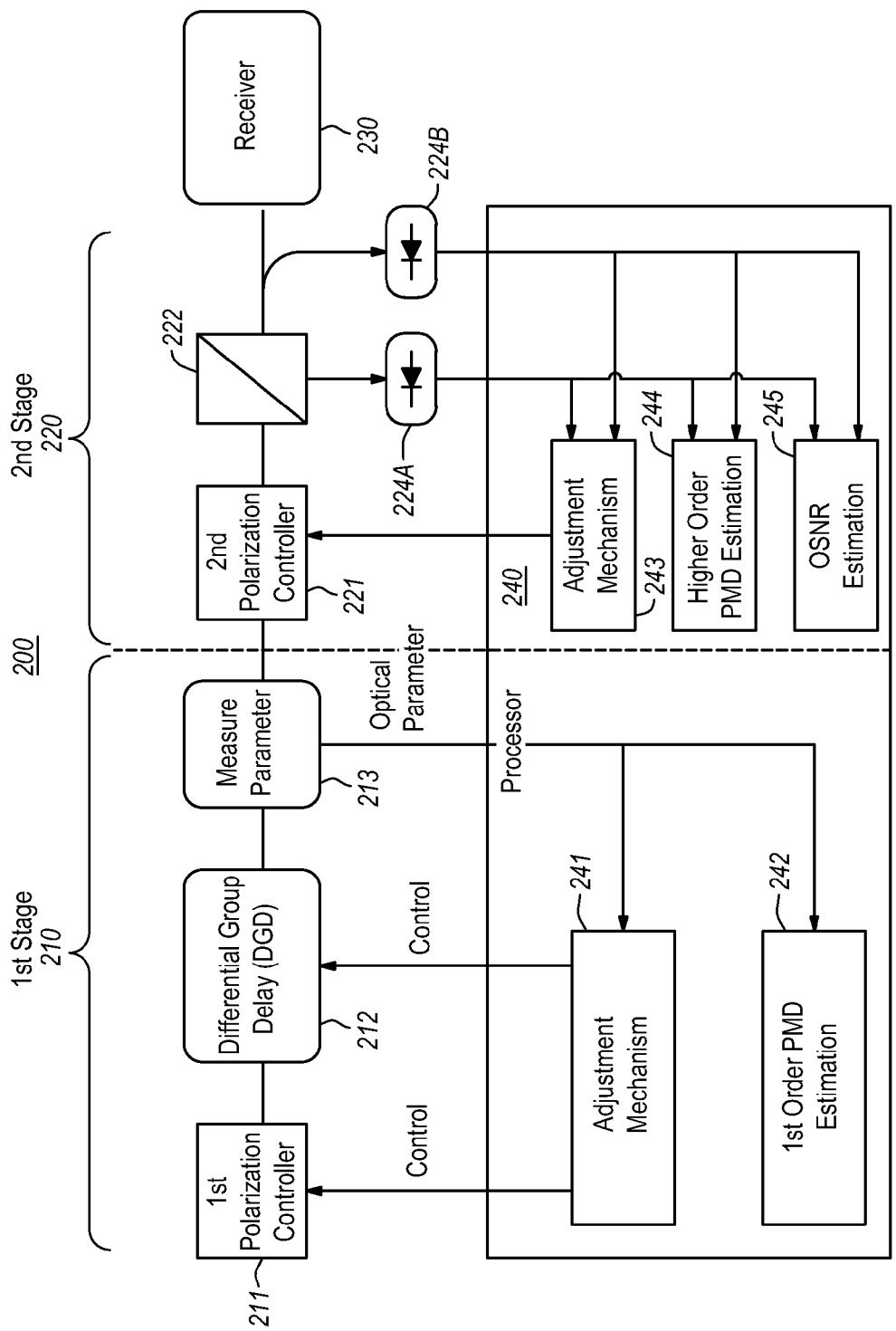
FIG. 2 illustrates a schematic diagram of a polarization mode dispersion (PMD) compensator.

FIG. 2 is a schematic diagram of a polarization mode dispersion (PMD) compensator 200. PMD arises because the different polarization modes travel at slightly different speeds through birefringent materials such as optical fibers. Furthermore, the polarization state of optical signals can vary quite rapidly as the optical signals travel through the optical signal.

Accordingly, even signals of a constant frequency may experience dispersion due to polarization state variations of the signal.

With reference to FIGS. 1 and 2, the PMD compensator 200 may, for example, be a component of the terminal 102 that receives eastern optical signals, or a component of the terminal 101 that receives western optical signals. The PMD compensator 200 may be positioned within the signal path after the optical signals are demultiplexed into constituent optical wavelength channels or into subgroups of optical wavelength channels.

In the illustrated case, the PMD compensator 200 may also act as a network monitor. The PMD compensator 200 includes a processor 240 or some type of logical processing capability. In FIG. 2, there are various elements shown as included within the processor, such as first adjustment mechanism 241, first order PMD estimation mechanism 242, second adjustment mechanism 243, higher order PMD estimation mechanism 244, and optical signal to noise ratio estimation mechanism 245. These mechanisms may be dedicated components of the processor 240, or perhaps may just be functions performed by the processor. In the latter case, there may not be a hardware distinction between the various elements 241 through 245. The functions may even be highly integrated. For instance, the function of adjusting the tunable differential group delay element may be integral to the function of estimating first order PMD.

The polarization mode dispersion compensator 200 includes two stages 210 and 220. The first stage 210 includes a first polarization controller 211, a tunable differential group delay (DGD) element 212, an optical parameter measurement mechanism 213, the first adjustment mechanism 241, and the first order PMD estimator 242. The first stage 210 performs first order PMD compensation and also provides a measurement of first order PMD.

The second stage 220 includes a second polarization controller 221, a beam splitter 222, measurement components 224A and 224B, the adjustment mechanism 243, the higher order PMD estimation mechanism 244, and the optical signal to noise ratio (OSNR) estimation mechanism 245. The second stage 220 performs partial mitigation of higher order PMD, provides an estimate of the magnitude of the higher order PMD, and provides an estimate of the OSNR.

Figure 3:
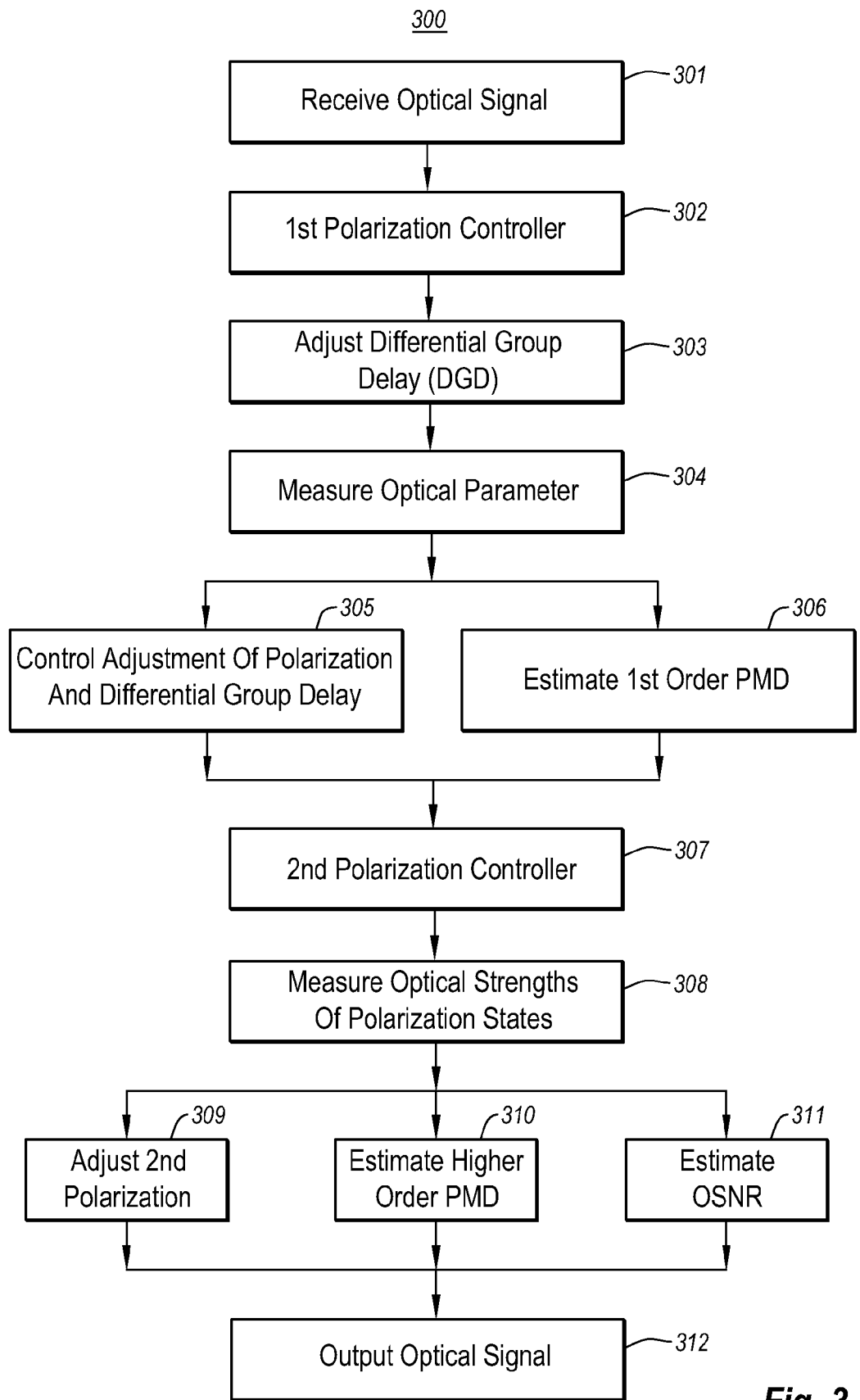
FIG. 3 illustrates a flowchart of a method for compensating for polarization mode dispersion (PMD) and estimating an optical signal to noise ratio (OSNR) and PMD of an optical system, which method may be performed by the PMD compensator of FIG. 2.

As the PMD compensator 200 may perform the method 300 of FIG. 3, the operation of the PMD compensator 200 will now be described with frequent reference to FIGS. 2 and 3. As the optical signals may be continuously received by the PMD compensator 200, the method 300 may be continuously performed as the optical signals are received.

As for the first stage 210, the optical signal passes through the first polarization controller 211, through the tunable DGD element 212 and into the optical parameter measurement mechanism 213. First, the optical signal is received into the first polarization controller 211 (act 301 of FIG. 3). For instance, if the polarization controller were in the terminal 102 of FIG. 1, the optical signal might be an eastern optical signal. If the polarization controller were in the terminal 101 of FIG. 1, the optical signal might be a western optical signal. The polarization controller 211 causes a change in the polarization state of the optical signal (act 302 of FIG. 3) in response to control signals from the adjustment mechanism 241.

The tunable differential group delay element 212 then receives the optical signal downstream of the polarization controller 211, and adjusts the differential group delay of the optical signal (act 303 of FIG. 3) also in response to control signals from the adjustment mechanism 241.

The optical parameter measurement mechanism 213 then measures an optical parameter of the optical signal downstream of the tunable differential group delay element (act 304). In one embodiment, the optical parameter measurement mechanism 213 is a polarimeter, the optical parameter measured by the polarimeter is a degree of polarization of the optical signal. In the case of a polarimeter, the polarimeter extracts the degree of polarization of the signal and passes this parameter to the processor 240 for the adjustment function 241.

The processor 240 then controls the adjustment of the polarization provided by the first polarization controller 211 and the adjustment of the differential group delay provided by the tunable DGD element 212 in response to the measured optical parameter, and in a manner that reduces first order polarization mode dispersion of the optical signal (act 305). The tunable DGD element 212 in combination with the first polarization controller 211 form a first order PMD compensator which acts to reduce and aims to minimize the total DGD.

For instance, suppose that the measured optical parameter made by the component 213 is a degree of polarization. In that case, the first order PMD compensation is achieved by manipulating the polarization controller 211 and the tunable DGD element 212 such that the vector sum of the system DGD (1st order PMD) and the adjustment to the DGD provided by the tunable DGD element 212 is zero. In other words, the 2 DGD vectors are approximately equal in length and approximately anti-parallel.

In order to identify this condition, the degree of polarization (DOP) measured by the polarimeter 213 is used as a feedback signal. DOP is strongly dependent on the amount of DGD in the system, and is a maximum when the DGD is a minimum. Therefore iteration of the polarization controller parameters and DGD element magnitude to achieve maximum DOP results in a minimum DGD and hence good compensation of the first order PMD. When this condition is achieved the setting of the tunable DGD element 212 provides an estimate of the 1st order PMD in the system. This function is represented in FIG. 2 by the first order polarization mode dispersion estimation component 242 that estimates first order polarization mode dispersion (act 306 of FIG. 3) using the level of adjustment of the differential group delay that exists at time in which the first adjustment mechanism has successfully reduced first order polarization mode dispersion.

Note that it could be argued that simply measuring the DOP and applying some formula to this value would allow the first order DGD to be estimated. However, DOP is also dependent on a number of other factors including bit rate and optical signal to noise ratio. Therefore the maximization method provides greater accuracy as well as being bit rate agnostic.

Considering the second stage 220 next, a second polarization controller 221 receives the optical signal downstream of the tunable differential group delay 212 element, and further adjusts the polarization of the optical signal to have a polarization state that results in reduction in higher order polarization mode dispersion (act 307) when combined with the polarization beam splitter. The resulting optical strengths of constituent polarization states of the signal are then measured (act 308).

For instance, the polarization beam splitter 222 downstream of the second polarization controller 211 receives the optical signal and passes light having a particular polarization orientation and diverts an orthogonal polarization orientation. In one embodiment, the second polarization controller 221 adjusts the polarization of the optical signal in an attempt to maximize the particular polarization orientation so that a maximum optical power of the particular polarization orientation passes through the polarization beam splitter 222.

In one embodiment, the polarization controller 221 attempts to maximize the optical power (H) of the horizontal component of the polarization of the optical signal. In that case, the horizontal component of the optical signal is permitted to pass through the polarization beam splitter 222, while the vertical component (V) is diverted by the polarization beam splitter 222. This is the case illustrated in FIG. 2. However, the polarization controller 221 might instead attempt to maximize the vertical component of the polarization of the optical signal. In that case, the outputs of the polarization beam splitter 222 may be switched to allow the vertical component of the optical power to pass, and divert the horizontal component of the optical power. Instead of passing vertical or horizontal arms of the optical signal, the beam splitter may instead pass any polarization arm, and divert any arm that is orthogonal to the passed polarization arm.

Measurement components 224A and 224B then sample optical power of the light that passes through the polarization beam splitter as well as sampling optical power of the light that is diverted by the polarization beam splitter. For instance, in the illustrated case, the optical power (V) of the vertical component of polarization of the optical signal is measured by component 224A, which may be a photodiode, whereas the optical power (H) of the horizontal component may be measured by component 224B, which may also be a photodiode.

The processor 240 uses a second adjustment function 243 that controls the adjustment of the polarization (act 309) provided by the second polarization controller 221 in a manner that the optical signal converges on the polarization state that results in reduction in higher order polarization mode dispersion. For instance, the adjustment function 243 may iterate through adjustments of the polarization controller 221 so as to maximize H. More generally, the adjustment function 243 may iterate through adjustments of the polarization controller 221 so as to maximize the power of the polarization arm that is to pass through the beam splitter 222.

Since the receiver 230 is attached to the horizontal arm of the polarization beamsplitter 222, the receiver 230 receives maximum or approximately maximum power in operation. The effect of the polarizer on the signal is twofold. First, the higher order components of the PMD are partially mitigated. This is achieved because higher order PMD causes a depolarization of the signal. Second, the optical signal to noise ratio (OSNR) of the signal is raised. The optical signal contains amplified spontaneous emission noise (ASE) from optical amplifiers in the system. By removing one polarization component the ASE noise level is halved and the spontaneous-spontaneous beat noise is reduced which enhances performance.

When the polarization controller 221 is aligned for strongest signal transmission through the polarizer, the degree of polarization (DOP) of the input signal provided to the polarization beam splitter is given by the following Equation 1:

$$DOP = (H-V)/(H+V) \quad \text{Equation 1}$$

If the first order PMD has already been cancelled (or at least reduced) in the first stage 210, any remaining depolarization will be from the optical SNR and the higher order PMD. If it is assumed that the OSNR remains relatively constant, whereas the higher order PMD fluctuates, then the highest obtained DOP will correspond to those periods when the higher order PMD is temporarily at zero. During these conditions, the OSNR may be estimated (act 311) from the ratio of powers in the horizontal and vertical arms as follows, since the horizontal arm is admitting signal+noise, whereas the vertical arm is just admitting noise:

$$OSNR = \frac{1}{2}\left(\frac{H}{V} - 1\right) \quad \text{Equation 2}$$

The processor 240 includes an OSNR estimation function 245 that estimates the optical signal to noise ratio using this methodology.

The remaining fluctuation of DOP over time correlates with the fluctuating higher order PMD and hence the magnitude of this component may be used to estimate the higher order PMD in the system (act 310). Thus, the processor 240 also includes a higher order PMD estimation component 244 that may estimate higher order PMD by taking the difference between the DOP calculated from Equation 1 at the two extremes.

A receiver 230 receives the light passed by polarization beam splitter 222 (act 312). Since the second polarization controller 221 attempts to maximize the light passed by the polarization beam splitter 222, the receiver 230 receives a higher optical power in the desired polarization state, thereby improving system performance. The second polarization controller 221 is preferably faster than the first polarization controller 211 to thereby allow the second polarization controller 221 to compensate for fluctuations caused by tracking of the first polarization controller 211.

Accordingly, a PMD compensator has been described which effectively compensates for first and higher order polarization mode dispersion, while measuring key performance parameters (such as OSNR, and PMD) of the system).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A polarization mode dispersion compensator comprising:
    a first polarization controller that receives an optical signal that has travelled through an optical fiber, and adjusts the polarization of the optical signal;
    a tunable differential group delay element that receives the optical signal downstream of the first polarization controller, and adjusts the differential group delay of the optical signal;
    an optical parameter measurement mechanism that measures a degree of polarization of the optical signal downstream of the tunable differential group delay element;
    a first adjustment mechanism that controls the adjustment of the polarization provided by the first polarization controller and the adjustment of the differential group delay provided by the tunable differential group delay element in response to the measured degree of polarization, the first adjustment mechanism forming a portion of a first feedback loop and configured to control the first polarization controller and the tunable differential group delay element in a manner that reduces first order polarization mode dispersion of the optical signal;
    a second polarization controller that receives an optical signal downstream of the tunable differential group delay element, and further adjusts the polarization of the optical signal to have a polarization state that results in reduction in higher order polarization mode dispersion; and a second adjustment mechanism that controls the adjustment of the polarization provided by the second polarization controller in a manner that the optical signal converges on the polarization state that results in reduction in higher order polarization mode dispersion, the second adjustment mechanism forming a portion of a second feedback loop that is distinct from the first feedback loop.

2. The polarization mode dispersion compensator in accordance with claim 1, wherein the first adjustment mechanism is configured to control the first polarization controller and the tunable differential group delay element in a manner that the degree of polarization is attempted to be maximized.

3. The polarization mode dispersion compensator in accordance with claim 1, wherein an optical distance of an optical fiber link that the optical fiber is or is part of is approximately 80 kilometers.

4. The polarization mode dispersion compensator in accordance with claim 1, wherein the optical fiber is a single mode optical fiber.

5. The polarization mode dispersion compensator in accordance with claim 1, further comprising a polarization beam splitter downstream of the second polarization controller and that passes light having a particular arm of polarization and diverts an orthogonal arm of polarization, wherein the second polarization controller adjusts the polarization of the optical signal in an attempt to maximize the particular arm of polarization.

6. The polarization mode dispersion compensator in accordance with claim 5, further comprising:
a receiver that receives the light passed by the polarization beam splitter.

7. The polarization mode dispersion compensator in accordance with claim 5, further comprising:
a measurement component that samples optical power of the light that passes through the polarization beam splitter as well as sampling optical power of the light that is diverted by the polarization beam splitter.

8. The polarization mode dispersion compensator in accordance with claim 7, further comprising:
an optical signal to noise estimation component that estimates an optical signal to noise ratio using the sampled optical powers.

9. The polarization mode dispersion compensator in accordance with claim 8, further comprising:
a first order polarization mode dispersion estimation component that estimates first order polarization mode dispersion using a level of adjustment of the differential group delay that exists at the time in which the first adjustment mechanism has successfully reduced first order polarization mode dispersion.

10. The polarization mode dispersion compensator in accordance with claim 8, further comprising:
a higher order polarization mode dispersion estimation component that estimates higher order polarization mode dispersion using a degree of polarization that exists at the time in which the second adjustment mechanism has successfully reduced higher order polarization mode dispersion.

11. The polarization mode dispersion compensator in accordance with claim 10, wherein a processor is the first adjustment mechanism, the second adjustment mechanism, the optical signal to noise estimation component, the first order polarization mode dispersion estimation component, and the higher order polarization mode dispersion estimation component.

12. The polarization mode dispersion compensator in accordance with claim 8, wherein the optical signal to noise determination component determines the optical signal to noise ratio at a time when a degree of polarization of the optical signal output from the second polarization controller is at or close to a minimum.

13. The polarization mode dispersion compensator in accordance with claim 5, wherein the particular arm is a horizontal arm and the orthogonal arm is a vertical arm.

14. The polarization mode dispersion compensator in accordance with claim 5, wherein the particular arm is a vertical arm and the orthogonal arm is a horizontal arm.

15. A method for compensating for at least a portion of polarization mode dispersion of a received optical signal, the method comprising:
an act of receiving an optical signal;
an act of a first polarization controller adjusting polarization of the received optical signal, the first polarization controller forming a portion of a first feedback loop;
an act of a tunable differential group delay element adjusting a differential group delay of the optical signal received from the first polarization controller;
an act of measuring a degree of polarization of the optical signal received from the tunable differential group delay element;
an act of controlling the adjustment of the polarization provided by the first polarization controller and the adjustment of the differential group delay provided by the tunable differential group delay element in response to the measured degree of polarization, and in a manner that reduces first order polarization mode dispersion of the optical signal; and
after the first order polarization mode dispersion of the optical signal has been reduced, an act of a second polarization controller further adjusting the polarization of the optical signal to have a polarization state that results in reduction in higher order polarization mode dispersion, the second polarization controller forming a portion of a second feedback loop that is distinct from the first feedback loop.

16. A polarization mode dispersion compensator comprising:
a first polarization controller that receives an optical signal that has travelled through a single mode optical fiber, and adjusts the polarization of the optical signal, the first polarization controller forming a portion of a first feedback loop;
a tunable differential group delay element that receives the optical signal downstream of the first polarization controller, and adjusts the differential group delay of the optical signal;
an optical parameter measurement mechanism that measures a degree of polarization of the optical signal downstream of the tunable differential group delay element;
a first adjustment mechanism that controls the adjustment of the polarization provided by the first polarization controller and the adjustment of the differential group delay provided by the tunable differential group delay element in response to the measured degree of polarization, the first adjustment mechanism configured to control the first polarization controller and the tunable differential group delay element in a manner that attempts to maximize the degree of polarization;

a second polarization controller that receives an optical signal downstream of the tunable differential group delay element, and further adjusts the polarization of the optical signal to have a polarization state that results in reduction in higher order polarization mode dispersion, the second polarization controller forming a portion of a second feedback loop that is distinct from the first feedback loop; and a polarization beam splitter downstream of the second polarization controller and that passes light having a particular arm of polarization and diverts an orthogonal arm of polarization, wherein the second polarization controller adjusts the polarization of the optical signal in an attempt to maximize the particular arm of polarization;

a second adjustment mechanism that controls the adjustment of the polarization provided by the second polarization controller in a manner that the optical signal tends to maximize the particular arm of polarization;

a measurement component that samples optical power of the light that passes through the polarization beam splitter as well as sampling optical power of the light that is diverted by the polarization beam splitter; and an optical signal to noise estimation component that estimates an optical signal to noise ratio using the sampled optical powers.

* * * * *